US009268956B2

(12) United States Patent
Anakata et al.

(10) Patent No.: US 9,268,956 B2
(45) **Date of Patent: *Feb. 23, 2016**

(54) ONLINE-MONITORING AGENT, SYSTEM, AND METHOD FOR IMPROVED DETECTION AND MONITORING OF ONLINE ACCOUNTS

(75) Inventors: Joseph Anakata, Alameda, CA (US); Daniel Hodges, San Francisco, CA (US)

(73) Assignee: Location Labs, Inc., Emeryville, CA (US)

( * ) Notice: Subject to any disclaimer, the term of this patent is extended or adjusted under 35 U.S.C. 154(b) by 141 days.

This patent is subject to a terminal disclaimer.

(21) Appl. No.: 13/249,996

(22) Filed: Sep. 30, 2011

(65) Prior Publication Data

US 2012/0151045 A1 Jun. 14, 2012

Related U.S. Application Data

(60) Provisional application No. 61/421,535, filed on Dec. 9, 2010.

(51) Int. Cl.

| | |
|---|---|
| ***G06Q 99/00*** | (2006.01) |
| ***G06F 21/60*** | (2013.01) |
| ***G06Q 50/26*** | (2012.01) |
| ***G06F 11/34*** | (2006.01) |
| *H04L 29/06* | (2006.01) |

(52) U.S. Cl.

CPC .......... *G06F 21/604* (2013.01); *G06F 11/3438* (2013.01); *G06Q 50/265* (2013.01); *G06F 2221/2149* (2013.01); *H04L 63/1425* (2013.01); *H04L 63/308* (2013.01)

(58) Field of Classification Search

CPC .......................... G06Q 50/265; G06F 11/3438
USPC .................................. 709/228, 229; 705/325
See application file for complete search history.

(56) References Cited

U.S. PATENT DOCUMENTS

| | | | | |
|---|---|---|---|---|
| 3,778,809 | A | 12/1973 | Hawes | |
| 6,011,973 | A | 1/2000 | Valentine et al. | |
| 6,690,940 | B1 | 2/2004 | Brown et al. | |
| 6,782,266 | B2 | 8/2004 | Baer et al. | |
| 7,181,229 | B2 | 2/2007 | Singh et al. | |
| 7,366,759 | B2 | 4/2008 | Trevithick et al. | |
| 7,849,502 | B1 * | 12/2010 | Bloch et al. | 726/11 |
| 7,869,792 | B1 * | 1/2011 | Zhou et al. | 455/411 |
| 7,899,438 | B2 | 3/2011 | Baker et al. | |
| 7,899,704 | B1 * | 3/2011 | Thompson | 705/14.34 |
| 7,996,005 | B2 * | 8/2011 | Lotter et al. | 455/432.3 |
| 8,175,642 | B2 | 5/2012 | Shah | |

(Continued)

OTHER PUBLICATIONS

Office Action dated Aug. 12, 2013 for U.S. Appl. No. 13/308,708.

(Continued)

*Primary Examiner* — Lance L Barry
(74) *Attorney, Agent, or Firm* — Dovas Law, P.C.

(57) ABSTRACT

A computer-implemented subject monitoring method is provided. The method includes providing an online-monitoring agent configured for monitoring a personal computing device, receiving identifying information associated with at least one of an account, email address, site, and service from the personal computing device via the online-monitoring agent, and monitoring via a network the at least one of the account, email address, site, and service based on the identifying information received via the online-monitoring agent.

25 Claims, 3 Drawing Sheets

(56) References Cited

U.S. PATENT DOCUMENTS

| | | | | |
|---|---|---|---|---|
| 8,185,953 | B2 * | 5/2012 | Rothstein et al. | 726/22 |
| 8,225,413 | B1 | 7/2012 | De et al. | |
| 8,270,933 | B2 | 9/2012 | Riemer et al. | |
| 8,279,808 | B2 * | 10/2012 | Sing et al. | 370/328 |
| 8,280,438 | B2 | 10/2012 | Barbera | |
| 8,384,555 | B2 | 2/2013 | Rosen | |
| 8,412,154 | B1 | 4/2013 | Leemet et al. | |
| 8,417,268 | B1 | 4/2013 | Halferty et al. | |
| 8,527,013 | B2 | 9/2013 | Guba et al. | |
| 8,620,354 | B2 | 12/2013 | Beasley | |
| 8,635,708 | B2 | 1/2014 | Mahan | |
| 8,661,123 | B2 * | 2/2014 | Nishiyama | 709/224 |
| 8,682,995 | B1 | 3/2014 | Lawler et al. | |
| 8,731,530 | B1 | 5/2014 | Breed et al. | |
| 8,761,821 | B2 | 6/2014 | Tibbitts et al. | |
| 8,825,759 | B1 | 9/2014 | Jackson et al. | |
| 8,935,245 | B1 | 1/2015 | Cionca et al. | |
| 9,019,068 | B2 | 4/2015 | Varoglu | |
| 9,042,872 | B1 | 5/2015 | Breed et al. | |
| 2002/0049806 | A1 * | 4/2002 | Gatz et al. | 709/203 |
| 2003/0126267 | A1 | 7/2003 | Gutta et al. | |
| 2004/0111479 | A1 | 6/2004 | Borden et al. | |
| 2004/0122681 | A1 | 6/2004 | Ruvolo et al. | |
| 2004/0166878 | A1 | 8/2004 | Erskine et al. | |
| 2005/0096009 | A1 | 5/2005 | Ackley | |
| 2006/0085419 | A1 | 4/2006 | Rosen | |
| 2006/0276180 | A1 | 12/2006 | Henry | |
| 2007/0277224 | A1 * | 11/2007 | Osborn et al. | 726/2 |
| 2008/0005325 | A1 * | 1/2008 | Wynn et al. | 709/225 |
| 2008/0066020 | A1 | 3/2008 | Boss et al. | |
| 2008/0146211 | A1 | 6/2008 | Mikan et al. | |
| 2008/0201441 | A1 | 8/2008 | Bodic et al. | |
| 2008/0270038 | A1 | 10/2008 | Partovi et al. | |
| 2008/0294589 | A1 | 11/2008 | Chu et al. | |
| 2009/0024747 | A1 | 1/2009 | Moses et al. | |
| 2009/0125499 | A1 | 5/2009 | Cross et al. | |
| 2009/0203352 | A1 | 8/2009 | Fordon et al. | |
| 2009/0248436 | A1 | 10/2009 | Takagi et al. | |
| 2009/0251282 | A1 | 10/2009 | Fitzgerald et al. | |
| 2009/0260064 | A1 * | 10/2009 | McDowell et al. | 726/4 |
| 2009/0271247 | A1 | 10/2009 | Karelin et al. | |
| 2009/0327150 | A1 * | 12/2009 | Flake et al. | 705/80 |
| 2010/0042684 | A1 * | 2/2010 | Broms et al. | 709/204 |
| 2010/0077444 | A1 | 3/2010 | Forristal | |
| 2010/0100398 | A1 | 4/2010 | Auker et al. | |
| 2010/0106573 | A1 | 4/2010 | Gallagher et al. | |
| 2010/0161369 | A1 | 6/2010 | Farrell et al. | |
| 2010/0211694 | A1 * | 8/2010 | Razmov et al. | 709/242 |
| 2010/0246797 | A1 | 9/2010 | Chavez et al. | |
| 2010/0330543 | A1 | 12/2010 | Black et al. | |
| 2011/0040586 | A1 | 2/2011 | Murray et al. | |
| 2011/0047282 | A1 | 2/2011 | Denman et al. | |
| 2011/0078036 | A1 | 3/2011 | Cummings et al. | |
| 2011/0092159 | A1 | 4/2011 | Park et al. | |
| 2011/0125844 | A1 * | 5/2011 | Collier et al. | 709/204 |
| 2011/0218884 | A1 | 9/2011 | Kothari et al. | |
| 2011/0244825 | A1 | 10/2011 | Ewell | |
| 2011/0244837 | A1 | 10/2011 | Murata et al. | |
| 2011/0289161 | A1 | 11/2011 | Rankin et al. | |
| 2011/0296014 | A1 | 12/2011 | Cancel et al. | |
| 2011/0307434 | A1 | 12/2011 | Rostampour et al. | |
| 2012/0047448 | A1 | 2/2012 | Amidon et al. | |
| 2012/0047560 | A1 | 2/2012 | Underwood et al. | |
| 2012/0058744 | A1 | 3/2012 | Felt et al. | |
| 2012/0084349 | A1 | 4/2012 | Lee et al. | |
| 2012/0102008 | A1 * | 4/2012 | Kaariainen et al. | 707/705 |
| 2012/0110071 | A1 | 5/2012 | Zhou et al. | |
| 2012/0151045 | A1 * | 6/2012 | Anakata et al. | 709/224 |
| 2012/0151046 | A1 * | 6/2012 | Weiss et al. | 709/224 |
| 2012/0151047 | A1 * | 6/2012 | Hodges et al. | 709/224 |
| 2012/0166285 | A1 | 6/2012 | Shapiro et al. | |
| 2012/0171990 | A1 | 7/2012 | Williams et al. | |
| 2012/0180135 | A1 | 7/2012 | Hodges et al. | |
| 2012/0201362 | A1 | 8/2012 | Crossan et al. | |
| 2012/0233256 | A1 | 9/2012 | Shaham et al. | |
| 2013/0141467 | A1 | 6/2013 | Han et al. | |
| 2013/0217363 | A1 | 8/2013 | Myers | |
| 2013/0282889 | A1 | 10/2013 | Tito | |
| 2014/0095630 | A1 | 4/2014 | Wohlert et al. | |
| 2014/0123043 | A1 | 5/2014 | Schmidt et al. | |
| 2014/0180438 | A1 | 6/2014 | Hodges et al. | |
| 2014/0280530 | A1 | 9/2014 | Fremlin et al. | |
| 2014/0280553 | A1 | 9/2014 | Hernandez et al. | |

OTHER PUBLICATIONS

Office Action dated Sep. 11, 2013 for U.S. Appl. No. 13/316,360.
Office Action dated Mar. 12, 2013 for U.S. Appl. No. 13/308,697.
Office Action dated Sep. 27, 2013 for U.S. Appl. No. 13/308,697.
Office Action dated Apr. 7, 2014 for U.S. Appl. No. 13/316,360.
U.S. Appl. No. 13/723,119, filed Dec. 20, 2012.
U.S. Appl. No. 13/837,882, filed Mar. 15, 2013.
Office Action dated Dec. 5, 2013 for U.S. Appl. No. 13/398,808.
Office Action dated May 29, 2014 for U.S. Appl. No. 13/398,808.
Office Action dated Dec. 29, 2014 for U.S. Appl. No. 13/308,697.
"Net Nanny Parental Controls User Guide" 2007, ContentWatch, Inc. http:/netnanny.com/assets/documentation/nn/netnanny_56.pdf, pp. 53-60.
Office Action dated Jan. 2, 2015 for U.S. Appl. No. 13/316,360.
Office Action dated Nov. 6, 2014 for U.S. Appl. No. 13/398,808.
Office Action dated May 19, 2015 for U.S. Appl. No. 13/308,697.
Office Action dated Jul. 6, 2015 for U.S. Appl. No. 13/316,360.

* cited by examiner

ONLINE-MONITORING AGENT, SYSTEM, AND METHOD FOR IMPROVED DETECTION AND MONITORING OF ONLINE ACCOUNTS

CROSS REFERENCE TO RELATED APPLICATION(S)

This application claims the benefit of U.S. provisional application No. 61/421,535, filed Dec. 9, 2010, which is incorporated by reference as if fully set forth.

BACKGROUND

This invention generally relates to computer network systems, and more particularly, to monitoring and detecting online accounts and online activities of minors by their parents and guardians.

Software solutions to help parents monitor their children's online accounts, participation in social networks, and other online activity can be categorized into two groups: native solutions and cloud-based solutions. Native solutions generally rely on software agents that are downloaded and installed locally on a computer, router, or other local node through which Internet traffic passes, the Internet traffic is monitored as it passes through. Native solutions can monitor this traffic for photos, text, friend requests, visited sites, and any other online activity that parents would be curious about. Cloud-based solutions are not installed locally, but rather monitor a child's activity by accessing the contents of the child's account and activity stream via network-based communication with the relevant sites and services, for example making use of the fact that many online sites expose application programming interfaces ("APIs") to developers for this very purpose.

There are strengths and weaknesses to each approach. The native solution is very proficient at capturing all traffic that passes through it. However, the native solution is blind to traffic and activity that occurs elsewhere on the Internet. This is especially noticeable as children increasingly have access to the Internet from phones, computers at school, friends' houses, and other non-traditional access points that a parent might not be able to access for the purpose of installing software. In contrast, a cloud-based approach can work consistently no matter where a child is accessing the Internet from. However, a major weakness of cloud-based solutions is that their initial setup usually requires the parent to initially identity the child on any social networking accounts of interest. Services exist which discover a child's accounts based on an identifier like an email address, but these services are imperfect and still require the parent to correctly initiate the system with the child's email address. Furthermore, once an online account is identified, cloud-based solutions often need some form of cooperation from the child such as either their login credentials or permission to access their account via a social networking site's platform. Permission is necessary to access the contents of the child's account and the full extent of his or her online activity.

What is needed is a method for monitoring minors' online activities in a more efficient and less cumbersome manner.

SUMMARY

An embodiment according to the within invention comprises a computer implemented method that comprises providing an online-monitoring agent configured for local monitoring of a personal computing device, receiving identifying information associated with at least one of an account, email address, site, and service from the personal computing device via the online-monitoring agent, and monitoring via a network the at least one of the account, email address, site, and service based on the identifying information received via the online-monitoring agent.

Another embodiment according to the present invention further comprises that the personal computing device includes at least one of a laptop, personal computer, smartphone, router or other internet enabled device.

Another embodiment according to the present invention further comprises that the online-monitoring agent includes at least one of native software and cloud-based software.

Another embodiment according to the present invention further comprises that the native software includes at least one of at least one of a key-logger, peer-to-peer processor, remote redirection agent, and hyper text transfer protocol secure down-grader.

Another embodiment according to the present invention further comprises that the cloud-based software includes at least one of a collection server, a poller server, a proxy server and obfuscation-system.

Another embodiment according to the present invention further comprises that the hyper text transfer protocol secure down-grader comprises removing an automatic redirect if a targeted application server executes a HTTP redirect process, accessing the targeted application server website directly such that at least one website page and user information can be intercepted, rewriting the intercepted at least one website page and user information to retain a connection using HTTP.

Another embodiment according to the present invention further comprises that rewriting intercepted website pages and user information further includes at least one of rewriting POST uniform resource locators in a form to be HTTP instead of HTTPS, rewriting link uniform resource locators in pages to be HTTP instead of HTTPS, changing a HTTP BASE HREF to be HTTP instead of HTTPS and rewriting rules to circumvent specific website protections for websites having website specific login procedures.

Another embodiment according to the present invention further comprises that the HTTPS-down-grader further comprises the steps of tracking a uniform resource locator of each element that is down-graded, whether the down-grade occurred via handling redirects or by rewriting website page contents and storing the uniform resource locator into a uniform resource locator list.

Another embodiment according to the present invention further comprises that a proxy is configured for accessing a uniform resource locator list to determine if an outgoing connection to a targeted application server website should use HTTP or HTTPS to meet the security requirements of the targeted site such that when the uniform resource locator list indicates a HTTP level of security, the proxy server will access the targeted application server website via HTTP or when the uniform resource locator list indicates a HTTPS level of security, the proxy server will access the targeted application server website via HTTPS.

Another embodiment according to the present invention further comprises that the HTTPS-down-grader comprises sending intercepted at least one web page and user information from the down-grader to HTTP sessions, to the collection server.

Another embodiment according to the present invention further comprises that the intercepted user information includes at least one of usernames, passwords, e-mail addresses and uniform resource locators.

The above and yet other objects and advantages of the within invention will become apparent from the hereinafter set forth Brief Description of the Drawings, Detailed Description of the Invention, and Claims appended herewith.

BRIEF DESCRIPTION OF THE DRAWING(S)

The foregoing Summary as well as the following detailed description will be readily understood in conjunction with the appended drawings which illustrate embodiments of the invention. In the drawings.

DETAILED DESCRIPTION OF ILLUSTRATIVE EMBODIMENTS

Figure 1:
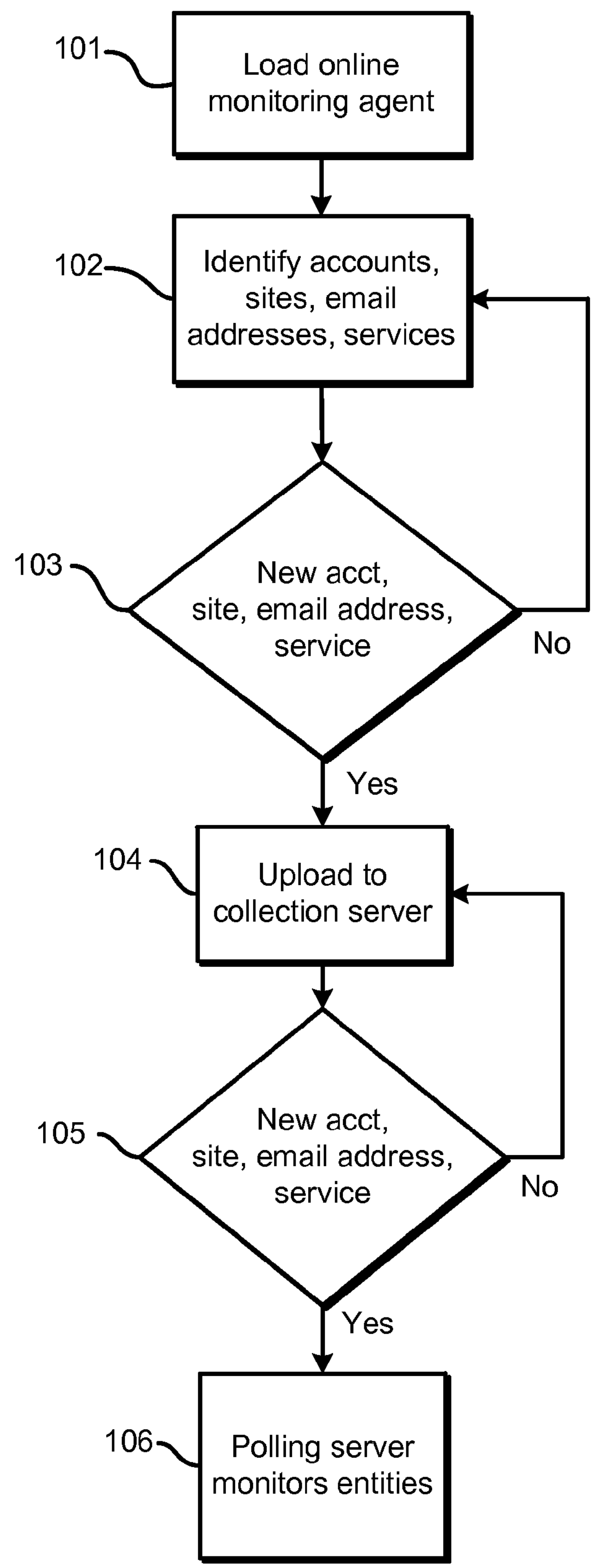
FIG. 1 illustrates a method for monitoring online accounts according to an embodiment of the within invention.

FIG. 1 illustrates a method for monitoring online accounts according to an embodiment of the within invention. A personal computing device such as a laptop, personal computer, smart-phone, router or other internet enabled device is loaded with an online-monitoring agent (Step 101). The online-monitoring agent comprises at least one of a key-logger, peer-to-peer processor, remote redirection agent, hyper text transfer protocol secure ("HTTPS") down-grader ("HTTPS-down-grader") also referred to as hyper text transfer protocol ("HTTP") defang and any other process that enable the tracking of data. The online-monitoring agent identifies which accounts, services, email addresses and sites the minor is using (Step 102). New identifying information is passed on to a cloud-based computer system, which preferably includes a collection server. The collection server monitors those accounts, sites and services (Step 103) in an ongoing manner, no matter where the minor is accessing those accounts, sites and services from. Meanwhile, each time the minor returns to one of the access points having the online-monitoring agent installed, that software continues to look for evidence of previously unknown accounts and email addresses, which can then be fed into the collection server (Step 104). A primary purpose of the collection server is to function as a common endpoint for all information collected. The information can include but is not limited to usernames, passwords, alternate e-mail addresses, visited website addresses to determine participation in anonymous forums and information gathered from components of the HTTPS-down-grader regardless of where those components reside, such as on end-user computers, residential gateways or a proxy server. If there is new information saved at the collection server, then that new information is picked up by a poller server (Step 105). The poller server periodically requests information about any monitored entities (Step 106). Monitoring levels vary depending on what information the collection server has on file for the monitored entities. In its simplest form the poller server polls publically available information on accounts such as on microblogging accounts that use 140 characters or less. More advanced functionality uses a username and password to log into a social networking site to determine newly added friends, check who the minor is corresponding with via private messages and other items of interest that are only accessible while logged in. The frequency of requests for different types of information may be tailored to meet a parent's or guardian's requirements. For example, since microblogging accounts that use 140 characters or less have account entries that are usually publically available, a parent may request querying for updates only once a day. However if the minor is frequently corresponding with newly added friends, monitoring frequency can be increased.

Another embodiment according to the invention comprises using the online-monitoring agent to obtain a minor's login credentials, so that those credentials can be fed back to a cloud-based system to enable direct access to the minor's online content and activity stream, without requiring direct participation or cooperation from the minor.

Another embodiment according to the present invention comprises an obfuscation-system that can generate alternate Internet protocol ("IP") addresses. The obfuscation-system can be used when a targeted application server has filters to prevent large numbers of connections for different users from a single IP address. The obfuscation-system will allow a system's hosted servers such as the collection server and poller server to originate connections to the targeted application server using the IP address of the minor's personal computing device. The obfuscation-system can handle connections for that specific minor or any number of other minors whose IP addresses are in a nearby network IP address block that is close to the minor's IP address.

Another embodiment according to the within invention comprises installing a HTTPS-down-grader in a proxy or on a residential gateway. The HTTPS-down-grader can function as a standard HTTP proxy configured by a user or the HTTPS-down-grader can function as a transparent proxy by intercepting traffic as it flows to a target site. A function of the HTTPS-down-grader is to process HTTPS connections to be down-graded to HTTP such that traffic can be monitored for usernames, passwords and other information such as web mail service, email addresses, and other user information that can be useful to have for monitoring the minor. Connections leaving the proxy destined for a targeted application server would still be encrypted via HTTPS if the original connection that was HTTPS-down-graded, was intended to be secure.

Figure 2:
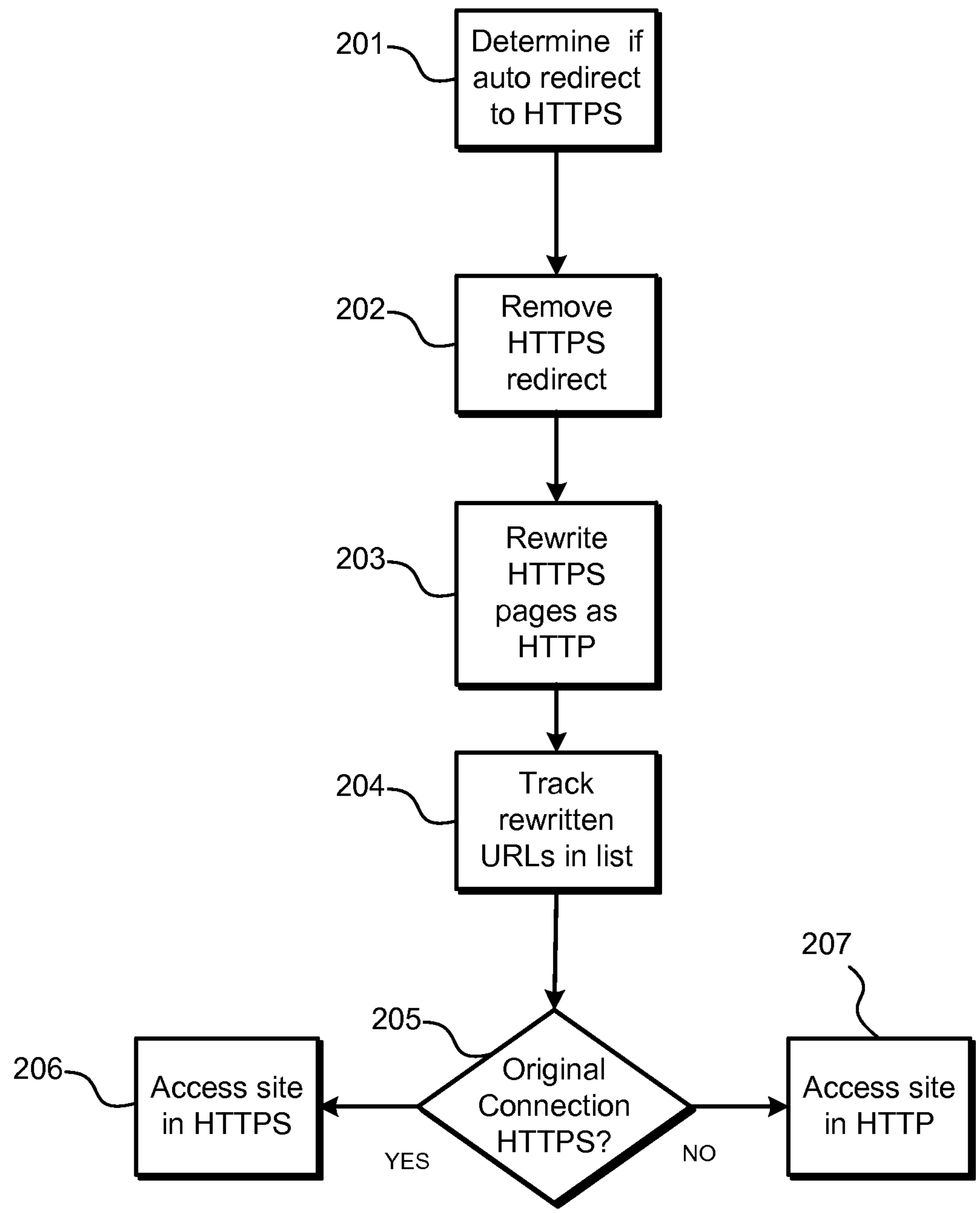
FIG. 2 illustrates a method for a HTTPS-down-grader according to an embodiment of the within invention.

FIG. 2 illustrates a method for a HTTPS-down-grader according to an embodiment of the within invention. If a targeted application server website does an automatic HTTP redirect process (Step 201), for example HTTP response status code 301 ("HTTP 301"), HTTP 302, HTTP 303 and HTTP 307, that upgrades a HTTP request to HTTPS, then the automatic redirect is removed (Step 202) and the targeted application server website is contacted directly so that the website page and user information can be intercepted. This would happen when a minor typed a bare domain name in an address bar of a browser but the targeted application server website uses HTTPS for all traffic. All intercepted website pages and user information will be rewritten to retain a connection using HTTP instead of HTTPS (Step 203). This applies whether the page being viewed was itself down-graded to HTTP such as in the case of a website having all content in HTTP but login/authentication is handled by a HTTPS based POST, or when the page itself was originally HTTP. Examples of rewriting include but are not limited to rewriting POST uniform resource locators ("URLs") in forms to be HTTP instead of HTTPS, to rewriting link URLs in pages to be HTTP instead of HTTPS, and changing a HTTP BASE HREF to be HTTP instead of HTTPS. Additionally, for sites with complicated login procedures or which fail to work with standardized procedures, website page specific rewriting rules can be added to circumvent those websites' protections as necessary. The HTTPS-down-grader will keep track of the URL of each element that is down-graded (Step 204) in a list, whether via handling redirects or by rewriting website page contents. When a proxy makes an outgoing connection, it will use the URL list to determine if the outgoing connection to the target site should use HTTP or HTTPS to meet the security requirements of the targeted site (Step 205). It will access the targeted application server website via HTTP when the URL list indicates a HTTP level of security (Step 206) or it will access the targeted application server website via HTTPS when the URL list indicates a HTTPS level of security (Step 207). Additionally the HTTPS-down-grader will send specified user information intercepted such as usernames, passwords, e-mail addresses and URLs, from the down-graded to HTTP sessions to the collection server.

Figure 3:
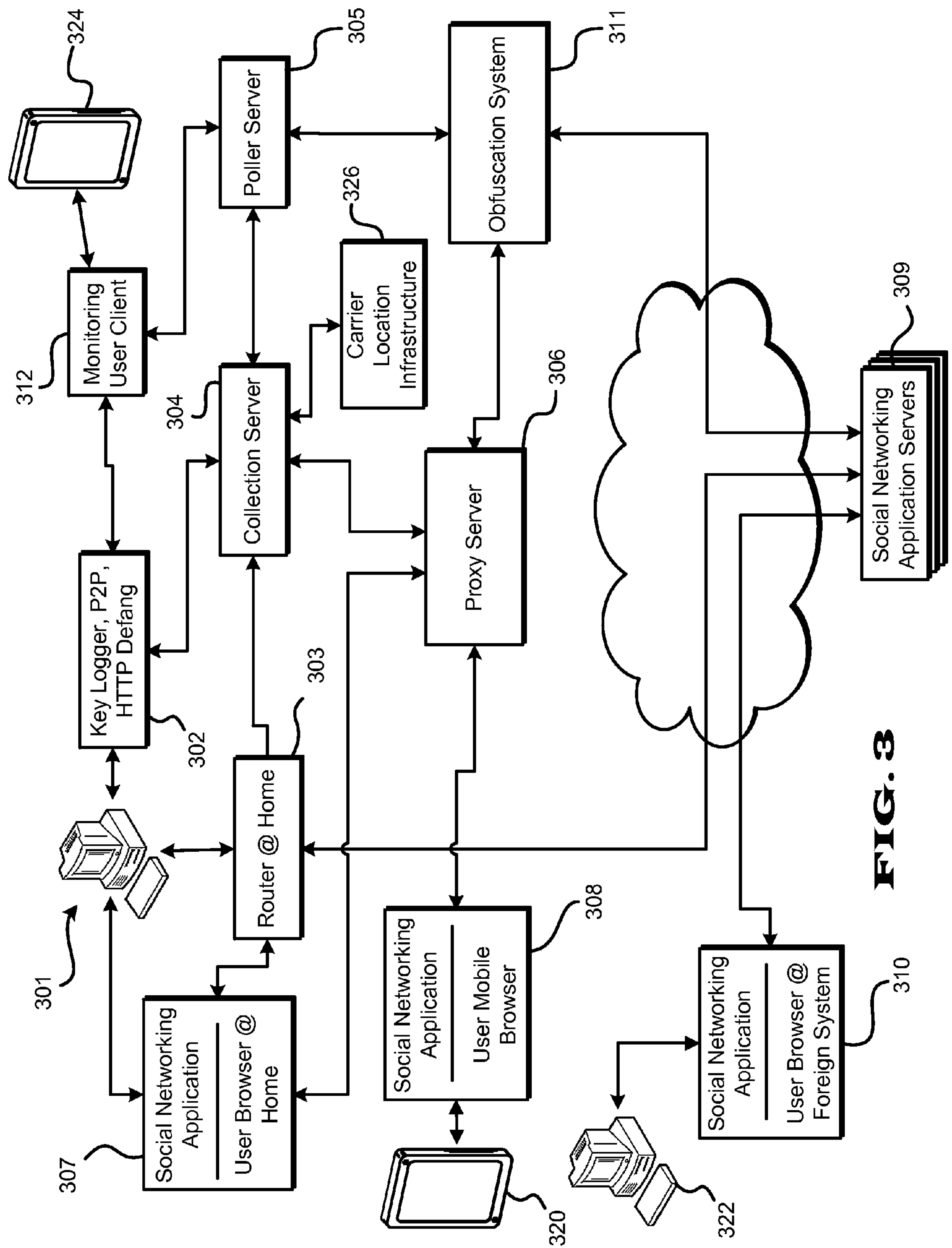
FIG. 3 illustrates a system for monitoring a minor's online activities according to an embodiment of the within invention.

FIG. 3 illustrates a system for monitoring a minor's online activities according to an embodiment of the within invention. A personal computing device 301 such as a personal computer, laptop, tablet, smart-phone or any other Internet accessible device is loaded with an online-monitoring agent 302 such as a key-logger, peer-to-peer processor, HTTPS-down-grader or any other software that can capture electronic user information. The online-monitoring agent 302 can alternatively be loaded onto a router 303 or other residential gateway. The personal computing device 301 can correspond for example to a computing device in the minor's home connected to the router 303.

The online-monitoring agent 302 or 303 collects and sends data to a collection server 304. The collection server 304 functions as a repository for a minor's electronic information such as usernames, device identifiers, email addresses and passwords. The collection server 304 is periodically polled for new and updated information by a poller server 305. A proxy server 306 including an HTTPS-down-grader interacts with browser access from a home browser 307, enabled for example by the personal computing device 301, or a mobile-browser 308, enabled for example by a smart-phone 320 operated by the minor targeted to a particular application server 309, to render accessible the minor's electronic user information to the collection server 304. The minor's user information can be collected for example during the minor's browser interactions with a social networking application (e.g. Twitter™, Facebook™) via a particular social networking application server 309. Alternatively for example, the minor's user information can be collected during interactions with a third party application (e.g. TweetDeck™, Plume™) which provides an alternate interface to the social networking application for example through an alternate application server configured for communication with the particular social networking application server 309.

The poller server 305 accesses information regarding a monitored minor from the social networking application servers 309, for example using user names, passwords or other user information provided by the collection server 304. The poller server 305 is configured to access information related to or inputted by a monitored minor on an application server 309 regardless of whether the information originates from the personal computing device 301, the home browser 307 executed on the device 301, the user mobile browser 308, or a foreign browser 310. The foreign browser 310, enabled for example by a foreign personal computing device 322, is a browser on an unrecognized system which can include for example a browser accessed by the minor residing on the minor's friend's computer, a public computer or other unrecognized system. The poller server 305 can access a minor's information on an application server 309 for example through connection to a publically accessible web interface, by logging on to the minor's social networking application account, or via an API exposed for the purpose of user monitoring. Alternatively, the online monitoring agent 302 or 303 can perform the functions of the poller server 305, connecting to the social networking application servers 309.

The poller server 305, or alternatively the online monitoring agent 302 or 303, provides status updates to monitoring users such as parents of a monitored minor at predetermined intervals or responsive to predetermined events. A monitoring user client 312, implemented for example on a suitable personal computing device 324, can interface with the poller server 305 and/or the online monitoring agent 302 or 303 to receive status updates regarding the minor's online activities. The status updates can include for example descriptions of postings by the minor or the minor's friends on particular social networking sites, indications of whether particular social networking sites are accessed by a device known by the poller server 305 and/or the online monitoring agent 302 or 303, and the times of such accesses. A status update can include an indication of an IP address from which a posting originated, or alternatively a geographic location from which a posting originated if the device from which the posting originated is location-enabled, for example a GPS-enabled smart phone.

If information extracted by the poller server 305 or the online monitoring agent 302 or 303 from a social networking application server 309 is determined not to correspond to activity of recognized systems recorded by the online monitoring agent 302 or 303 or the collection server 304, the status provided to the monitoring user client 312 can include an indication that a posting originated from an unknown device (i.e. foreign system). Alternatively, such status can be provided responsive to a determination that extracted information includes information corresponding to a system not recognized as associated with the monitored minor. The online monitoring agent 302 or 303 and/or the poller server 305 preferably maintain a listing of known devices corresponding to the minor for making such determination. The status provided to the monitoring user client 312 can include for example a statement such as "your child appears to be accessing Facebook™ from a device other than your home PC or his mobile phone" or "your child accessed Twitter™ from an unknown system at 4:00 pm".

If it is determined that the posting originated from an unknown device, for example the foreign personal computing device 322, the collection server 304 can query the location of a location-enabled mobile device known to be associated with the monitored minor, for example the smart phone 320. The collection server 304 can query the location of the location-enabled mobile device 320 directly or via a request to a telecommunication carrier location infrastructure 326. The collection server 304, or alternatively the online monitoring agent 302 or 303, provides a status to the monitoring user client 312 indicating that a particular social networking application was accessed by an unknown system at a particular time at a particular location. The status provided to the monitoring user client 312 can include for example a statement such as "your child accessed Twitter™ from an unknown system at 4:00 pm at or near 924 Spruce Street", or "your child accessed Facebook™ from an unknown system at 12:30 pm at or near Northern Public Library."

Some application servers have filters to prevent large numbers of connections for different users from a single IP address. An obfuscation-system 311 allows a system's hosted servers such as the collection server 304 and poller server 305 to originate connections to the targeted application server using the IP address of the minor's personal computing device. The obfuscation-system 311 can handle connections for that specific minor or any number of other minors whose IP addresses are in a nearby network IP address block that is associated with the minor's IP address. When necessary the obfuscation-system 311 can generate alternate IP addresses using a peer to peer process or any other system process suitable for generating IP addresses.

The collection server 304, poller server 305, proxy server 306 and obfuscation system 311 can be embodied by one or a plurality of physical systems and enabled by hardware, software or combinations thereof. The social networking application servers 309 can be executed on or enabled by any suitable number of systems or devices.

Having described embodiments for a system and method for range search over distributive storage systems, it is noted that modifications and variations can be made by persons skilled in the art in light of the above teachings. It is therefore to be understood that changes may be made in the particular embodiments of the invention disclosed which are within the scope and spirit of the invention as defined by the appended claims.

What is claimed is:

1. A computer-implemented monitoring method comprising:

providing an online-monitoring agent configured for local monitoring of a personal computing device;

accessing via the online-monitoring agent a uniform resource locator (URL) list to determine if an outgoing connection to a targeted application server website should use Hypertext Transfer Protocol (HTTP) or Hypertext Transfer Protocol Secure (HTTPS) to meet the security requirements of the targeted application server website such that when the URL list indicates a HTTP level of security, the online-monitoring agent accesses the targeted application server website via HTTP and when the URL list indicates a HTTPS level of security, the online-monitoring agent accesses the targeted application server website via HTTPS;

removing via the online-monitoring agent an automatic redirect if the targeted application server executes a Hypertext Transfer Protocol (HTTP) redirect process;

accessing via the online-monitoring agent the targeted application server website directly such that at least one website page can be intercepted; and rewriting via the online-monitoring agent the intercepted at least one website page to retain a connection using HTTP;

receiving identifying information associated with at least one of an account, email address, site, and service from the personal computing device via the online-monitoring agent; and monitoring via a network the at least one of the account, email address, site, and service based on the identifying information received via the online-monitoring agent.

2. The computer-implemented-monitoring method of claim 1 wherein the personal computing device includes at least one of a laptop, personal computer, smart-phone, router or other internet enabled device.

3. The computer-implemented-monitoring method of claim 1 wherein the online-monitoring agent includes at least one of native software and cloud-based software.

4. The computer-implemented-monitoring method of claim 1 wherein the cloud-based software includes at least one of a collection server, a poller server, a proxy server and obfuscation-system.

5. The computer-implemented-monitoring method of claim 1 wherein the native software includes at least one of at least one of a key-logger, peer-to-peer processor, remote redirection agent, and HTTPS-down-grader.

6. A computer-implemented monitoring method comprising:

providing an online-monitoring agent configured for local monitoring of a personal computing device;

removing via the online-monitoring agent an automatic redirect if a targeted application server executes a Hypertext Transfer Protocol (HTTP) redirect process;

accessing via the online-monitoring agent the targeted application server website directly such that at least one website page can be intercepted; and rewriting via the online-monitoring agent the intercepted at least one website page to retain a connection using HTTP;

receiving identifying information associated with at least one of an account, email address, site, and service from the personal computing device via the online-monitoring agent; and monitoring via a network the at least one of the account, email address, site, and service based on the identifying information received via the online-monitoring agent.

7. The computer-implemented-monitoring method of claim 6 wherein the step of rewriting further includes at least one of rewriting POST uniform resource locators (URLs) in a form to be HTTP instead of Hypertext Transfer Protocol Secure (HTTPS), rewriting link URLs in pages to be HTTP instead of HTTPS, changing a HTTP BASE HREF to be HTTP instead of HTTPS and rewriting rules to circumvent specific website protections for websites having website specific login procedures.

8. The computer-implemented-monitoring method of claim 6, further comprising:

tracking via the online-monitoring agent a URL of each element that is down-graded, whether the down-grade occurred via handling redirects or by rewriting website page contents; and storing the URL into a URL list.

9. The computer-implemented-monitoring method of claim 8 further comprising sending intercepted user information from a down-graded HTTP sessions to a collection server.

10. The computer-implemented-monitoring method of claim 9 wherein the intercepted user information includes at least one of usernames, passwords, e-mail addresses and URLs.

11. The computer-implemented monitoring method of claim 6 further comprising:

extracting via the online-monitoring agent information associated with a first user associated with the at least one account, email address, site, and service; and providing via the online-monitoring agent the information to a second user.

12. A computer-implemented monitoring method comprising the steps of:

maintaining device identifying information of at least one device associated with a first user;

providing an online-monitoring agent configured for local monitoring of the at least one device;

receiving identifying information associated with at least one of an account, email address, site, and service from the at least one device via the online-monitoring agent;

monitoring via a network the at least one of the account, email address, site, and service based on the identifying information received via the online-monitoring agent;

extracting via the online-monitoring agent information associated with the first user associated with the at least one account, email address, site, and service;

determining via the online-monitoring agent whether the extracted information associated with the first user associated with the at least one account, email address, site, and service is associated with the at least one device; and providing via the online-monitoring agent to a second user the extracted information and the determination of whether the extracted information is associated with the at least one device.

13. The computer-implemented monitoring method of claim 12, further comprising:

determining via the online-monitoring agent that the extracted information is not associated with the at least one device of which the online-monitoring agent is configured for local monitoring;

determining via the online-monitoring agent a location of a particular one of the at least one device, the location corresponding to the extracted information; and reporting via the online-monitoring agent to the second user the extracted information is not associated with the at least one device and reporting the determined location of the particular one of the at least one device corresponding to the extracted information.

14. The computer-implemented monitoring method of claim 12, further comprising:

determining via the online-monitoring agent that the extracted information corresponds to an indication that the first user accessed a particular network-accessible application from a device of which the online-monitoring agent is not configured for local monitoring, the method further comprising:

determining via the online-monitoring agent a location of a particular one of the at least one device of which the online-monitoring agent is configured for local monitoring, the location corresponding to a time at which the first user accessed the particular network-accessible application from the device of which the online-monitoring agent is not configured for local monitoring; and reporting via the online-monitoring agent to the second user that the first user accessed at the determined location the particular network-accessible application from the device of which the online-monitoring agent is not configured for local monitoring.

15. The computer-implemented monitoring method of claim 14, further comprising reporting via the online-monitoring agent to the second user a particular time that the first user accessed the particular network-accessible application from the device of which the online-monitoring agent is not configured for local monitoring.

16. A network-connectable computer system comprising:

a personal computing device for providing an online-monitoring agent configured for local monitoring;

at least one server for receiving identifying information associated with at least one of an account, email address, site, and service from the personal computing device via the online-monitoring agent, and for accessing a uniform resource locator (URL) list to determine if an outgoing connection to a targeted application server website should use Hypertext Transfer Protocol (HTTP) or Hypertext Transfer Protocol Secure (HTTPS) to meet the security requirements of the targeted application server website wherein when the URL list indicates a HTTP level of security, the targeted application server website is accessed via HTTP and when the URL list indicates a HTTPS level of security, the targeted application server website is accessed via HTTPS, the at least one server further configured for:

removing via the online-monitoring agent an automatic redirect if the targeted application server executes a Hypertext Transfer Protocol (HTTP) redirect process;

accessing via the online-monitoring agent the targeted application server website directly such that at least one website page can be intercepted; and rewriting via the online-monitoring agent the intercepted at least one website page to retain a connection using HTTP; and a network for monitoring the at least one of the account, email address, site, and service based on the identifying information received via the online-monitoring agent.

17. The network-connectable computer system of claim 16 wherein the personal computing device includes at least one of a laptop, a personal computer, a smart-phone, a router and an internet enabled device.

18. The network-connectable computer system of claim 16 wherein the at least one server includes at least one of a collection server, a poller server, a proxy server and an obfuscation-system.

19. A network-connectable computer system comprising:

a personal computer device for providing an online-monitoring agent configured for local monitoring, the online-monitoring agent configured for performing a method comprising:

removing an automatic redirect if a targeted application server executes a Hypertext Transfer Protocol (HTTP) redirect process;

accessing the targeted application, server website directly such that at least one website page can be intercepted; and rewriting the intercepted at least one website page to retain a connection using HTTP;

at least one server for receiving identifying information associated with at least one of an account, email address, site, and service from the personal computing device via the online-monitoring agent; and a network for monitoring the at least one of the account, email address, site, and service based on the identifying information received via the online-monitoring agent.

20. The network-connectable computer system of claim 19 wherein the online-monitoring agent includes at least one of native software and cloud-based software.

21. The network-connectable computer system of claim 19 wherein the online-monitoring agent includes at least one of at least one of a key-logger, peer-to-peer processor, remote redirection agent, and HTTPS-down-grader.

22. The network-connectable computer system of claim 19 wherein the step of rewriting further includes at least one of rewriting POST uniform resource locators (URLs) in a form to be HTTP instead of Hypertext Transfer Protocol Secure (HTTPS), rewriting link URLs in pages to be HTTP instead of HTTPS, changing a HTTP BASE HREF to be HTTP instead of HTTPS and rewriting rules to circumvent specific website protections for websites having website specific login procedures.

23. The network-connectable computer system of claim 19 wherein the online-monitoring agent is further configured for:

tracking a URL of each element that is down-graded, whether the down-grade occurred via handling redirects or by rewriting website page contents; and storing the URL into a URL list.

24. The network-connectable computer system of claim 19 wherein the online-monitoring agent is further configured for sending intercepted user information from down-graded HTTP sessions to the at least one server.

25. The network-connectable computer system of claim 24 wherein the intercepted user information includes at least one of usernames, passwords, e-mail addresses and URLs.

* * * * *